(12) United States Patent
Lagerman

(10) Patent No.: US 8,280,372 B2
(45) Date of Patent: Oct. 2, 2012

(54) AIRBORNE ONBOARD BASE TRANSCEIVER STATION FOR MOBILE COMMUNICATION

(75) Inventor: Mikael Lagerman, Göteborg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1136 days.

(21) Appl. No.: 12/158,898

(22) PCT Filed: Dec. 22, 2005

(86) PCT No.: PCT/SE2005/002034
§ 371 (c)(1),
(2), (4) Date: Jun. 23, 2008

(87) PCT Pub. No.: WO2007/073268
PCT Pub. Date: Jun. 28, 2007

(65) Prior Publication Data
US 2008/0299965 A1  Dec. 4, 2008

(51) Int. Cl.
*H04W 4/00* (2009.01)
(52) U.S. Cl. ......... 455/431; 455/12.1; 455/98; 455/561; 340/981; 370/316
(58) Field of Classification Search ............. 455/431, 455/561, 575.5, 98; 370/316; 340/981, 7.41
See application file for complete search history.

(56) References Cited

U.S. PATENT DOCUMENTS

| | | | | |
|---|---|---|---|---|
| 6,201,797 | B1 * | 3/2001 | Leuca et al. ............. | 370/316 |
| 6,269,243 | B1 | 7/2001 | Corbefin et al. | |
| 6,745,037 | B1 | 6/2004 | Neumann et al. | |
| 2006/0270470 | A1 * | 11/2006 | de La Chapelle et al. . | 455/575.5 |

FOREIGN PATENT DOCUMENTS

| | | |
|---|---|---|
| DE | 19920153 C2 | 5/2001 |
| EP | 1061686 A | 12/2000 |
| EP | 1478106 A | 11/2004 |
| EP | 1631111 A1 | 3/2006 |
| WO | WO98/56192 | 12/1998 |
| WO | WO 2006075126 A1 | 7/2006 |

OTHER PUBLICATIONS

Wireless Communication Inside Shielded Envelope, Specification, U.S. Appl. No. 60/684,199, de La Chapelle et al., pp. 1-20, filed May 24, 2005.*
Fitzsimons: "Ericsson Launches Airborne Cellphone Base Station", Aviation International News, Jun. 2005, Paris Air Show, Paris, France.
Lawson: "In-Flight Cell Phone Systems Gain Altitude", Infoworld, Jun. 15, 2005, retrieved from the web on Feb. 28, 2011 at URL http://www.infoworld.com/t/networking/in-flight-cell-phone-systems-gain-altitude-860.
Lawson: "In-Flight Cell Phone Systems Gain Altitude", PC World, Jun. 15, 2005, URL http://www.pcworld.com/article/121399/inflight_cell_phone_systems_gain_altitude.html.
Marsh: "In-Flight Cell Phones", Avionics Magazine, Oct. 1, 2005, URL http://www.aviationtoday.com/avissue/feature/In-Flight-Cell-Phones_1146.html.
Berioli, et al.: "Demonstrator Specification Document"; Wireless Cabin IST-2001-37466.
Berioli, et al.: "WirelessCabin Target System Specification Document"; Wireless Cabin IST-2001-37466.

* cited by examiner

*Primary Examiner* — Anthony Addy
*Assistant Examiner* — Khalid Shaheed
(74) *Attorney, Agent, or Firm* — Roger S. Burleigh

(57) ABSTRACT

The invention refers to a base station, BTS, (BTS) and a method for a BTS, for a cellular communication system comprising a user equipment, UE, (UE) onboard an aircraft (1) being at a predetermined altitude and a terrestrial network. The invention is characterized in that the base station (BTS) is arranged to be an airborne onboard BTS (BTS) comprising a screening device (2) generating a first signal (S1) being matched to screen a second signal (S2) from the terrestrial network at a predetermined altitude. The onboard BTS (BTS) also comprises a signal generator (3) generating a third signal (S3) being stronger than both the first signal (S1) and the second signal (S2), the onboard BTS (BTS) being arranged to establish a communication link with the UE (UE) via the third signal (S3).

2 Claims, 6 Drawing Sheets

AIRBORNE ONBOARD BASE TRANSCEIVER STATION FOR MOBILE COMMUNICATION

ABBREVIATIONS

1G First generation wireless mobile communication network
2.5G GPRS and EDGE.
2G Second generation wireless mobile communication network
3G Third generation wireless mobile communication network
4G Fourth generation wireless mobile communication network
AMPS Advanced Mobile Phone Service (1G)
AMPS/D Digital Advanced Mobile Phone Service (2G)
BCCH Broadcast Control Channel, one of three BCH
BCH GSM Broadcast Channels, i.e. FCCH, SCH and BCCH
BSC Base Station Controller
BTS Base Transceiver Station
CCCH Common Control CHannels
CDMA Code Divisional Multiple Access
CDMA2000 also known as IMT-CDMA Multi-Carrier or 1xRTT (3G)
DCCH Dedicated Control CHannel
EDGE Enhanced Data rates for GSM Evolution (2.5G)
FACCH Fast Association Control Channel
FCCH Frequency Correction Channel
GPRS General/GSM Packet Radio Service (2.5G)
GSM Global System for Mobile communications (2G)
IS-95 Interim Standard 95 (IS-95), is the first CDMA-based digital cellular standard
NMT Nordic Mobile Telephony (1G)
RBS Radio Base Station, the network access point in radio communication with UE served by the network.
SACCH Slow Association Control CHannel
SCH Synchronization Channel
SDCCH Standalone Dedicated Control Channel
TCH Traffic Control CHannel
TDMA Time Division Multiple Access
UE User Equipment, e.g. a cellular phone
UMTS Universal Mobile Telecommunications System (3G)

TECHNICAL FIELD

The invention refers to a base station, BTS, and a method for a BTS, for a cellular communication system comprising a user equipment, UE, onboard an aircraft being at a predetermined altitude, and a terrestrial network.

BACKGROUND ART

In the field of mobile communication systems it is known to use mobile telephones (cellular phones) and other devices using means for wireless communication, hereinafter abbreviated UE for User Equipment. The UE has an omni directional antenna sending out signals in a spherical pattern to a terrestrial network. The terrestrial network is built up from a number of cells managed by a number of base stations connected to ground antennas covering each cell. The ground antennas are normally not omni directional, but restricted to an azimuth angle giving a horizontal sector and an altitude angle giving a vertical sector.

The UEs communicate with that base station having the best communication parameters for the moment. When the communication parameters are altered for the worse, for example when the UE moves away from the base station and migrates to another cell, the UE moves from the weaker base station to a neighbouring base station with better communication parameters.

Cellular networks are sustained by a pattern of adjacent cells of radio coverage. First generation (1G) systems, such as NMT, AMPS, etc. and second generation (2G) system, such as GSM, utilize different frequencies to separate neighboring cells whereas UMTS apply logical coding to achieve cell separation. The reason for using different frequencies and codes respectively is to minimise interference problems for UEs in neighbouring cells.

However, the numbers of frequencies are limited why the cellular pattern has to be repeated in a larger area, in order to use the same frequency a number of times.

When a UE is used onboard an aircraft a problem occurs when the plane is at a distance from the ground because the line of sight from above is so wide that a signal from the UE engages/interferes with a number of cells using the same frequency. For example, if a person onboard an aircraft at an altitude above 3000 m turns on his cellular phone, the omni directional antenna will send in at least the direction of sight and will thus finally engage/interfere with a number of different cells using the same frequency or code. This causes the above mentioned problem with interference for a number of UEs in the terrestrial network and may therefore out voice utilized frequency/timeslot combinations in a large region of the network, also at distances far outside the normal GSM cell radius. Furthermore, it is a waste of recourses to use or block the same frequency in a number of different cells in order to perform the same task. Yet further problems occur if the cells engaged are owned by different network managers. Similar problems occur if a passenger has forgotten to turn off the cellular phone. The cellular phone then communicates to a number of cells in order to announce its position and to roam in on new network operators.

Today there is no method to prevent a mobile from initiating access to any network it has previously been granted access to (on a national/operator level). If the home operator has a roaming agreement with an operator in another country the UE may then be able to interconnect anywhere while within radio coverage of that operator's network.

Even without this approval, all GSM UEs, shall be allowed to make emergency calls in any network while within coverage, why some interaction will take place unless measures are made.

There are also situations when a government, the operator of the network or others, like to prevent a UE to interact with other networks than a dedicated access point or access points.

Therefore, there is a desire for a better communication system that can control communication/traffic to and from a UE in an aircraft, giving no or minimised interference problems in the terrestrial network.

DISCLOSURE OF INVENTION

The invention refers to a base station (hereinafter called BTS) for a cellular communication system comprising a user equipment (hereinafter called UE) onboard an aircraft being at a predetermined altitude and a terrestrial network. The invention is characterised in that the BTS is arranged to be an airborne onboard BTS comprising a screening device generating a first signal being matched to screen a second signal from the terrestrial network at a predetermined altitude. The onboard BTS also comprises a signal generator generating a third signal being stronger than the first signal and/or the second signal. The onboard BTS is arranged to establish a communication link with the UE via the third signal In a first embodiment, "matched" refers to the first signal having a first effect in a first frequency band being matched to screen the second signal having a second effect in a second frequency band. The first frequency band is equal to or greater than the second frequency band.

In one embodiment of the invention the third signal has a third effect and a third frequency band being at least partly or completely within the first frequency band of the first signal.

The communication link is established because the third effect of the third signal is greater than the first effect and/or because the third effect being greater than the second effect.

The invention also refers to a method for a communication system.

One effect of the invention is that the first signal screens the second signal so that the UE cannot establish a communication link directly to the terrestrial network. The UE cannot therefore home in on a certain frequency within the frequency band of the second signal. This is an advantage since the use of UEs onboard the aircraft will not disturb the terrestrial network by engaging a number of cells being based on the same frequency or coding. However, if the UE can trace an acceptable cell, the UE will adapt to the frequency used in the cell. Therefore, an initial match is not prerequisite for interference to appear.

Hence, without the inventive communication system all traffic would be carried though to the terrestrial networks, with major radio interference for all terrestrial UEs as a result. The onboard BTS according to the invention thus provides a fine instrument to locally control the traffic transmission channels without inter-working with all networks in the potentially affected terrestrial region.

Another advantage is that neither the terrestrial network nor the onboard UE have to be altered in order to avoid the above stated problem. Hence, the fourth signal is the normal signal being generated in the UE.

The invention according to the first embodiment may be used in all existing terrestrial networks such as AMPS/D-AMPS, GSM, cdma/CDMA 2000 and UMTS, i.e. all existing 1G, 2G, 3G, 3.5 and possibly also future 4G systems. All frequency channels at these bands are screened to force the UE to move to a dedicated band with allowed access channels supported by the onboard BTS. The dedicated band may be a narrow band within the screened band or a different band.

The onboard BTS may comprise a signal detection device that detects the second signal from the terrestrial network. The information is utilized by the onboard device when determining the signal strength and frequency of the first signal. However, the onboard BTS may lack a detection device, but may instead be programmed for certain events, i.e. the first signal has a signal strength and frequency already set for different events. The onboard BTS may then be controlled to use different modes dependent on the event at hand. The onboard BTS may be controlled both manually and automatically.

The third signal has a predetermined effect in a predetermined frequency band when leaving the onboard BTS so that the ratio between the third signal and the second signal and or the third signal and the first signal corresponds at least to the minimum requirement for signal to noise ratio (s/n) accepted by the UE in order to establish a communication link.

In one embodiment of the invention, the first signal covers the entire frequency spectrum used by the terrestrial network. This may be implemented by the onboard BTS sending out the first signal in the form of a pulsed signal with a repetition interval being short enough to generate a number of pulses for all frequency channels within one time slot. The accumulated pulses within one time slot have enough energy to screen the second signal such that the signal to noise ratio becomes too low in order to establish a communication link. However, the screening device may send out a continuous signal covering all frequency channels used by the terrestrial system.

The invention is intended to be used during the following scenario. When the aircraft is on the ground and ready to take off, all passengers are asked to turn off their communication devices, i.e. UEs, such as mobile phones and computers comprising communication equipment. When the aircraft is airborne at a certain altitude, the screening device is turned on and the onboard passengers are allowed to turn their UEs on. When the UEs are turned on, the screening device has generated the first signal screening all signals (the second signal) from the terrestrial network thereby disturbing the UEs reception of the terrestrial second signal necessary to make/initiate direct contact with the terrestrial network. The signal generator generates the third signal being stronger than the first signal (and/or the second signal) and at a certain frequency or frequencies. The UEs are searching for a signal with acceptable signal to noise ratio and homes in on the third signal. The onboard BTS thus creates an onboard cell in which the UEs may be used. The system is preferably arranged so that the crew can start the screening device without the onboard BTS signal generator being active. This causes the possibility to block all UEs from being able to communicate. The signal generator may then independently be switched on and switched off when traffic is to be allowed or prohibited respectively.

The onboard BTS is preferably connected to an onboard antenna in the form of a leaky cable extending in the longitudinal direction of the aircraft and in the vicinity of a passenger using a UE. This short distance between the UE and the antenna gives the possibility to keep the power of the first and third signals at a minimum.

The onboard BTS is connected to a satellite link handling traffic between the aircraft and dedicated base stations in the terrestrial network. The onboard BTS thereby mediates traffic between the terrestrial network and the UEs via the satellite link. The satellite link comprises an onboard satellite antenna sending signals to a satellite positioned at a higher level than the aircraft. The satellite communicates with the dedicated bases station. The satellite link may comprise a modem between the onboard BTS and the satellite. The communication between the onboard BTS and the modem may be based on A-bis (Interface between BSC and BTS in GSM) or IP (Internet protocol). The satellite link may be exchanged to a link between an onboard antenna directed to the ground communicating with a dedicated base station or base stations.

Below are two examples of how the invention may be used in a GSM based terrestrial network. The examples shall not be considered limiting for the invention, but as a mere intention to further explain the invention

FIRST EXAMPLE

The GSM frequencies are evenly distributed over the GSM 900, GSM 1800 and over the GSM 1900 bands. A cell normally uses between 2 and 12 different frequencies.

When the aircraft is at an altitude of 3000 m the second signal has lost approximately 107 dB because of the transport through the air and 10 dB because of the signal penetrating the wall of the aircraft. Additional losses are caused by the vertical antenna gain of the terrestrial BTS. The signal strength in the aircraft of the received second signal from the terrestrial network is about −95 dBm after the above mentioned losses. The signal strength of the first signal is set to +15 dB above the received terrestrial second signal strength and the third signal is defined to a signal strength of additionally +15 dB, i.e. approximately 30 dB margin to the second signal.

The screening device generates the first signal comprising all the necessary frequencies and with an effect of about 3 dBm per 200 KHz when entering the antenna system. The third signal may have an initial effect of up to 35 W/45 dBm when entering the antenna system coupled to the onboard BTS. For the case with 15 dB margin to the first signal it is sufficient with an initial effect of 18 dBm when entering the antenna system.

The UE has a threshold for the signal to noise ratio (s/n) of at least 7 dB in order to establish a communication link with the onboard BTS. In the case where the first signal has an effect of about 3 dBm, and with the chosen 15 dB additional strength compared to the first signal, the third signal has an effect of at least 18 dBm. The effect is dependent on frequency and bandwidth.

However, if the level of the second signal strength is known exactly, and since the s/n ratio must be 7 dB for the UE to accept the signal, the first signal could have a signal strength being less than the signal strength of the second signal, namely down to 7 dB but not below the second signal strength, for example 6.5 dB below the second signal. The third signal must then add at least 7 dB to the second signal in the aircraft.

Therefore, suitable levels of the first signal have been shown to be between 0 to 12 dBm when entering the antenna, dependent on the type of aircraft construction due to the fact that, the larger the aircraft the longer the antenna and the greater the losses.

The UE cannot transmit a signal below 0 dBm why this level is the starting point for received signal in the terrestrial network from the UE.

SECOND EXAMPLE

The example discusses a worst case estimate of the interference level at the onboard BTS and the terrestrial system using GSM 1800 and isotropic antennas.

A terrestrial BTS transmits normally at 30 dBm (1 W) to 60 dBm in the horizontal plane. The resulting energy level at distance of 3 km has been measured to −85 dBm. The aircraft chassis adds another 10 dB of shielding, resulting in a −95 dBm signal level from the terrestrial BTS inside the cabin.

The screening device will be configured to exceed this level with about 15 dB, i.e. the onboard UE shall perceive a first signal level of −80 dBm. The required effect of the first signal from the onboard BTS per frequency channel fed into the leaky antenna cable are calculated by compensating for the antenna coupling Loss (73 dB for one antenna) and the antenna cable alternation (4 dB) resulting in −3 dBm. This effect, being the worst case, is reduced by 10 dB due to shielding of the chassis and the free space loss lost in traversing to ground (107 dB) and the results is −120 dBm impact on the terrestrial network from the screening device.

The onboard BTS will transmit the third signal at a level that is received by the UE at an additional 15 dB above the first signal, i.e. −65 dBm. Similar to the screening device ground impact calculation above the impact at ground from the third signal equals −105 dBm.

To prevent the UE to initiate calls with the UE maximum signal level, i.e. +30 dBm, the onboard BTS will be configured to limit the UE to its minimum signal level, i.e. 0 dBm. This configuration is done in a BSC in a terrestrial system and is fed to the UE in the third signal. The BSC communicates with the onboard BTS via a dedicated route, for example, a satellite communication link. The BSC may be placed in any location suitable for the purpose of managing one or a number of onboard BTS in the air. Reception at ground would be about 0 dBm (UE output)-10 dB (aircraft chassis) −107 dB (air transmission lost over 3000 m)=−117 dBm. From this the negative antenna gain of the terrestrial BTS should be deducted. The impact from the third signal is normally so weak that it is drowned in the background noise at the terrestrial level.

The conclusion from this calculation is that the mutual impact on terrestrial and onboard networks is neglectable as long as the screening device prevents the onboard UEs to gain direct access to the terrestrial network.

The total effect required by the screening device and the signal generator may also be concluded from the above. First the losses in antenna near components (6 dB) have to be taken in account. The resulting screening device (first signal) and signal generator (third signal) output power are 3 respective 18 dBm per frequency channel. The screening device will transmit on the full GSM 900 and GSM 1800 bands (124+ 375) 499 frequency channels adding (10×Log 499) 27.0 dB resulting in 30 dBm total screening device output power in the first signal. In one example, the signal generator in the onboard BTS will only transmit at three or less frequency channels (4.8 dB) resulting in 22.8 dBm onboard BTS output power of the third signal. However, the signal generator may generate a third signal comprising more frequency channels than three and the BTS output power must then be enhanced accordingly.

The above mentioned parameters are different for different aircrafts, different terrestrial systems, different altitudes, etc, why the inventive onboard BTS have to be adapted accordingly.

In one embodiment of the invention the first signal does not cover the entire frequency band corresponding to the second signal, but only a part of the frequency band.

In a second embodiment of the invention, the screening device is arranged to generate a pulsed first signal being matched to screen a control channel in the second signal in the cellular network.

Here "screen" refers to the first signal being transmitted in the same region where the second signal is transmitted such that the first signal is superposed onto at least that part of the second signal comprising the control channel thereby disturbing the information in the control channel. If the information is disturbed the UE cannot read the information and cannot therefore establish a connection.

Here "match" refers to the screening device being fed information on the second signal in the form of duration, effect, repetition interval and position of the control channel in the second signal, and from that information calculating and generating the pulsed first signal with a suitable pulse interval and repetition interval and effect so that the pulsed first signal disturbs the second signal during that time period the control channel is transmitted in the network.

One benefit of the embodiment is that only a part of the second signal needs to be blocked in order to prevent the UE to establish a connection with the network. Therefore the screening device does not have to be used continuously. On the contrary the screening device generates the first signal in the form of one pulse with a predetermined pulse interval and at a predetermined repetition interval. The predetermined pulse interval and the predetermined repetition interval shall be set such that the control channel is blocked. The screening device thus uses only a fraction of the duration of the second signal. The benefit of this embodiment thus lies in the screening device being less power consuming and may, for the same power usage, thus be utilised at a higher degree than a continuous screening device by generating a number of different pulses for screening of additional signals from the network.

In a GSM based communication system the pulsed first signal has a first effect in a first frequency band utilised by the UE and the network. The first effect in the first signal is matched to screen the control channel in the second signal.

In GSM, a frequency band is divided, using a FDMA scheme, into a number of carrier frequencies with 25-30 khZ bandwidth being spaced one from each other by a 200 khz frequency band measured from the apex of the 25-30 KHz bandwidth. Each carrier frequency is then divided in time using a TDMA scheme. This scheme splits the radio channel into 8 time slots. A time slot is the unit of time in a TDMA system, and it lasts approximately 0.577 ms. A TDMA frame is formed with 8 time slots and lasts, consequently, 4.616 ms. Each of the eight time slots, that form a TDMA frame, are then assigned to a single user. However, in GPRS it is possible for a user to obtain a number of time slots in order to get access to increased data rate. Each TDMA designates one time slot to a control channel in the form of a BCH and designates the rest of the time slots to traffic channels TCH and control channels in the form of CCCH and/or DCCH. It is only the BCH that needs to be disturbed in order to prevent traffic. The BCH burst length is also referred to as a BCH batch. Three different types of BCHs can be distinguished BCHs are used, by the BTS (here a transceiver), to provide the UE with the sufficient information it needs to synchronize with the network. The BCH burst length extends over 5 and ⅛ TDMA frames and consequently 23.657 ms long The BCH burst length is also referred to as a BCH batch. Three different types of BCHs can be distinguished:
  The Broadcast Control Channel (BCCH), which gives to the UE the parameters needed in order to identify and access the network
  The Synchronization Channel (SCH), which gives to the UE the training sequence needed in order to demodulate the information transmitted by the base station
  The Frequency-Correction Channel (FCCH), which supplies the UE with the frequency reference of the system in order to synchronize it with the network In order to prevent GSM traffic it is only necessary to screen frequency channels transmitting any of the BCH.

Furthermore, theoretically only frequency channels transmitting the BCH batch needs to be screened in order for the receiving UE to be prevented from initiating network connection due to the low quality of the received signal. Theoretically this can be achieved by the screening device being time synchronized with the network and where the first signal has pulse interval of one time slot and a repetition interval being identical to the BCH burst length.

However, since the screening device is not necessarily time synchronized with the network, the first signal needs a theoretical minimum pulse interval of 4.616 ms (eight Time Slots) in order to secure screening of one full, or parts of two, BCH Time Slots. With BCH burst length that equals 23.657 ms the screening device must transmit periodically with a period time not exceeding 23.5 ms to secure not to risk any BCH batch to pass through intact.

However, testing has shown an optimal screening effect when the pulse interval in the first signal is at least 7 ms with a repetition interval of maximum 23.5 ms.

The screening device can utilize the silent time of the duty cycle to screen additional frequency channels and thereby increase the screening capability of the screening device by a factor about three compared to continuous screening. A further advantage is that the screening device can use 70% additional effect compared to the continuous screening or, for the same effect as the continuous signal, use 70% less power and thus giving 70% additional useful life when running on battery. One additional advantage is that the 70% power saving gives the possibility to increase the output signal three times with the same useful life as a continuously operated screening device.

Another advantage of the embodiment is that the source of the screening device will also be more difficult to track and locate due to the intermittent signalling.

To sum up, it is possible to screen the second signal continuously, according to the first embodiment, by sending the first signal as a continuous signal interfering with the second signal in its entirety, or to use a pulsed first signal according to the second embodiment, with all the advantages stated above.

One effect of the invention is that the first signal screens the second signal so that the UE cannot establish a communication link and cannot therefore home in on a certain frequency within the frequency band of the second signal.

At present, the 2G GSM frequencies are evenly distributed over the GSM-1800 and over the GSM-1900 bands. A cell normally uses between 2 and 12 different frequencies.

The invention is not limited to a GSM based system, but may be used on different systems using a second signal with a BCH batch (BCH burst length) different number of time slots with different duration and different number of control channels. The invention must then be adapted by altering the pulse interval and the pulse repetition interval in the first signal accordingly.

For example, the screening device may be used in a CDMA (Code Division Multiple Access) system using codes to identify connections. The screening device must here be matched to generate a first signal with a pulse length and repetition interval matching the corresponding control channel.

In a CDMA based communication system the first signal is matched to disturb the pilot signal and may comprise a code. The pilot signal in a CDMA based system corresponds to the BCH batch in the TDMA based GSM system. However, in a CDMA based system the BCH batch may be in a different form than the above stated, and the control channel in such a signal is disturbed with a pulsed signal.

In one embodiment of the invention, the screening device is arranged to generate the pulsed first signal with a pulse length being of the same length or at least of the same length as the pulse length of the control channel and with a repetition interval less than the BCH batch for the communication system in question.

In another embodiment of the invention, the screening device is arranged to generate the pulsed first signal with a pulse length being of the same length or at least of the same length as the pulse length of the control channel and with a repetition interval identical to the repetition interval of at least one control channel within a broadcast channel burst length.

In the two latter embodiments, the above mentioned advantages are maintained.

In a further embodiment of the invention, the screening device may be comprised in a BTS transmitting the second signal, i.e. in a terrestrial network. The benefit of this solution is that the communication between the UE and the BTS may be controlled by the screening device without any changes being made in the second signal.

In yet a further embodiment of the invention, the screening device comprises a detection device that detects and analyses the second signal. The onboard BTS uses the information in order to match the first signal to screen the second signal and to give the third signal such configuration that the UE can distinguish the third signal from the first and second signals.

The third signal may comprise information intended for the control of the UE. Examples of such information is maximum transfer unit that limits the output effect of the UE and maximum timing advance (TA) giving the UE information on how large the cell logically is.

BRIEF DESCRIPTION OF DRAWINGS

The invention will below be described further in connection to a number of drawings where.

EMBODIMENTS OF THE INVENTION

Figure 1:
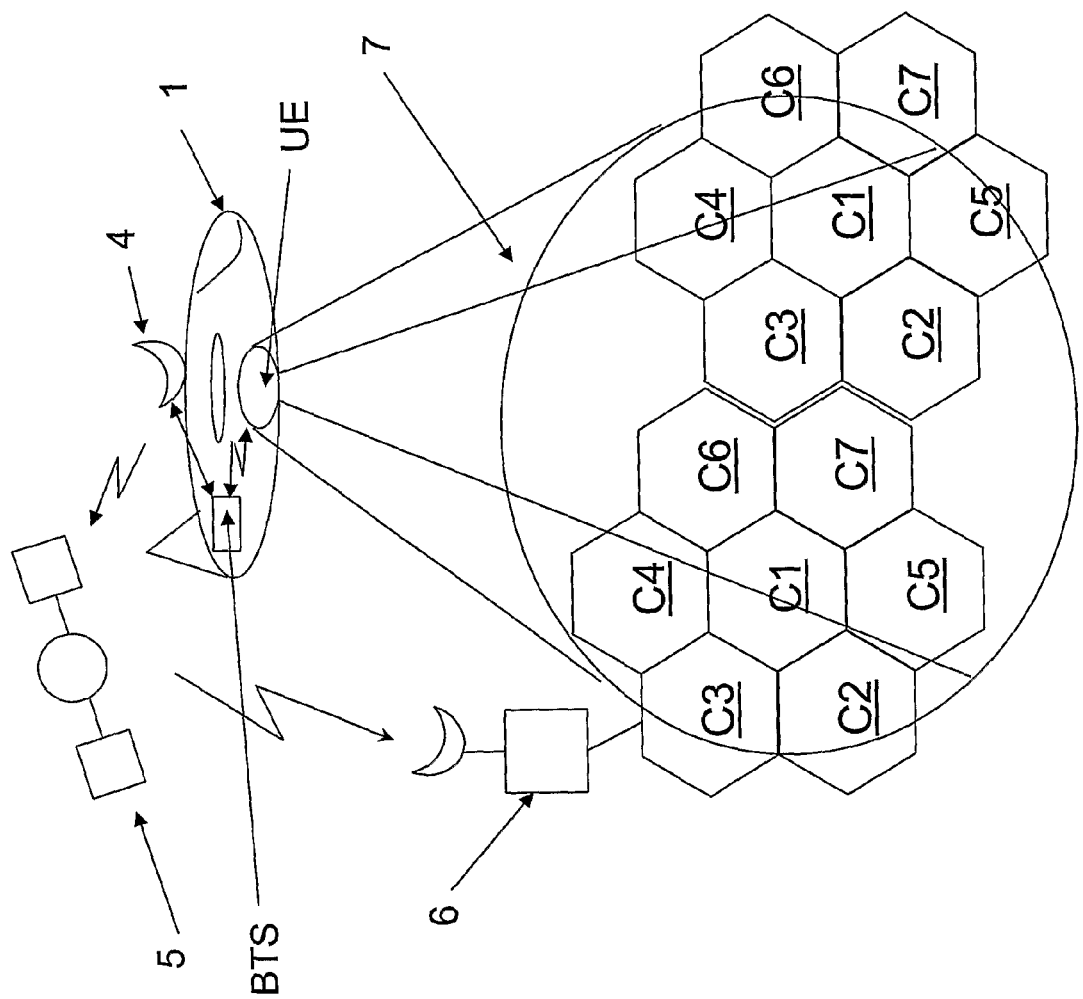
FIG. 1 schematically shows an onboard BTS according to the invention onboard an aircraft at an altitude overlooking a part of a terrestrial network.

FIG. 1 schematically shows a base station BTS (hereinafter called BTS) according to the invention onboard an aircraft 1 at an altitude overlooking a part of a terrestrial network comprising cells C1, C2, C3, C4, C5, C6 and C7 in a reoccurring pattern. The cell frequency plan is such that adjacent cells are not using the same frequencies in order to minimize disturbances from other cells using the same frequency. The onboard BTS comprises a screening device 2 and a signal generator 3. The onboard BTS is connected to a satellite link comprising a satellite antenna 4, a satellite 5 and a dedicated bases station 6 in the terrestrial network. Onboard the airplane 1 is a UE comprising an omni directional antenna. In FIG. 1 the line of sight for the UE is shown as a cone 7. The UE may potentially communicate with all the cells C1-C7 within the cone 7.

Figure 2:
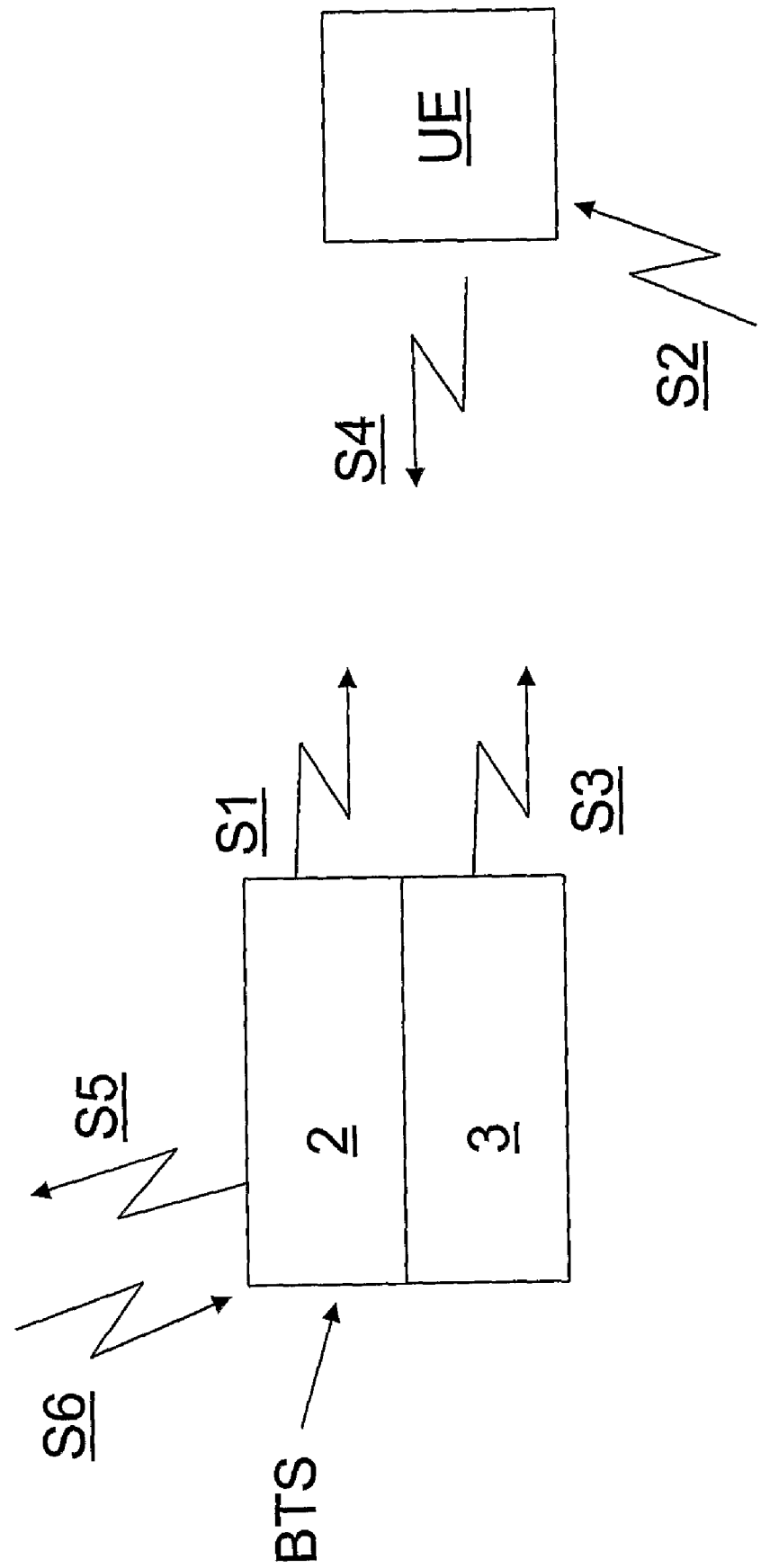
FIG. 2 schematically shows a traffic scheme in a network comprising the onboard BTS and the UE according to FIG. 1.

FIG. 2 schematically shows a traffic scheme in a network comprising the onboard BTS and the UE according to FIG. 1.

The onboard BTS comprises the screening device 2 generating the first signal S1 and the signal generator 3 generating the third signal S3. The Terrestrial network transmits the second signal S2 being possible for the UE to receive. The UE also transmits a fourth signal S4 in an omni directional pattern. However, the fourth signal is not strong enough to interfere with the terrestrial network, but the communication is established between the onboard BTS and the UE via the third signal S3 and the fourth signal S4. The onboard BTS also transmits a fifth signal S5 intended to be linked to the terrestrial network. The onboard BTS also receives a sixth signal S6 from the terrestrial network. The fifth and sixth signals form a communication link between the onboard BTS a dedicated terrestrial BTS, and ultimately a communication link between the UEs and the terrestrial communication system.

The BTS transmit signals by use of a transmitting unit (not shown) and receives signals by use of a receiving unit (not shown).

Figure 3:
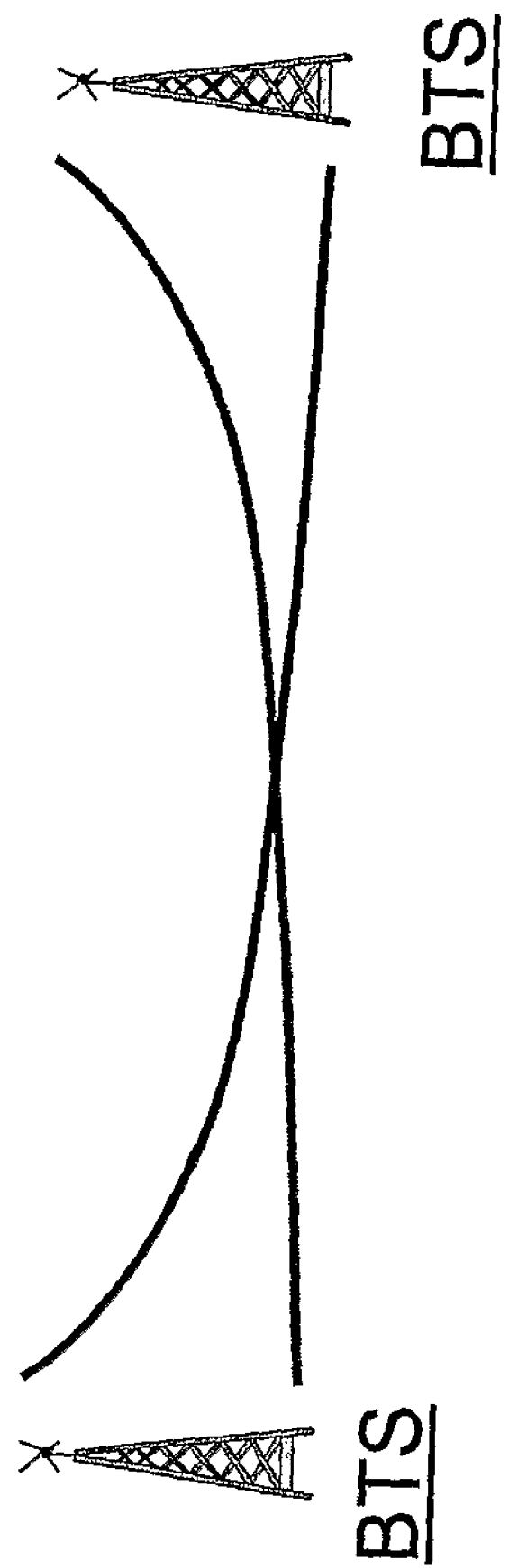
FIG. 3 schematically shows a signal to noise ratio scheme between two cells.

FIG. 3 schematically shows a signal to noise ratio (hereinafter called s/n) scheme between two cells operated by two terrestrially bound BTS.

The terrestrial network is designed to handle a certain s/n. If two adjacent GSM cells would use the same frequency there would be a region, a "dead zone", where both cells have too low s/n to operate.

Furthermore, FIG. 3 shows that the signal strength decreases in air since the s/n decreases with distance. This is utilised in the invention since the UE has to receive a signal with an s/n over a predetermined threshold in order to establish a connection. The screening device in the onboard BTS generates the first signal that increases the noise so that the s/n becomes below the threshold. Since the second signal from the terrestrial network has been decreased on its way to the aircraft, the screening device only has to generate a correspondingly weak first signal in order to decrease the s/n below the threshold. The weak first signal S1 does not disturb the terrestrial network because it decreases in strength on its way from the aircraft 1 to the ground so that when it reaches the base stations in the terrestrial network, the first signal S1 does not add much or no noise to the signals close to the ground.

Figure 4:
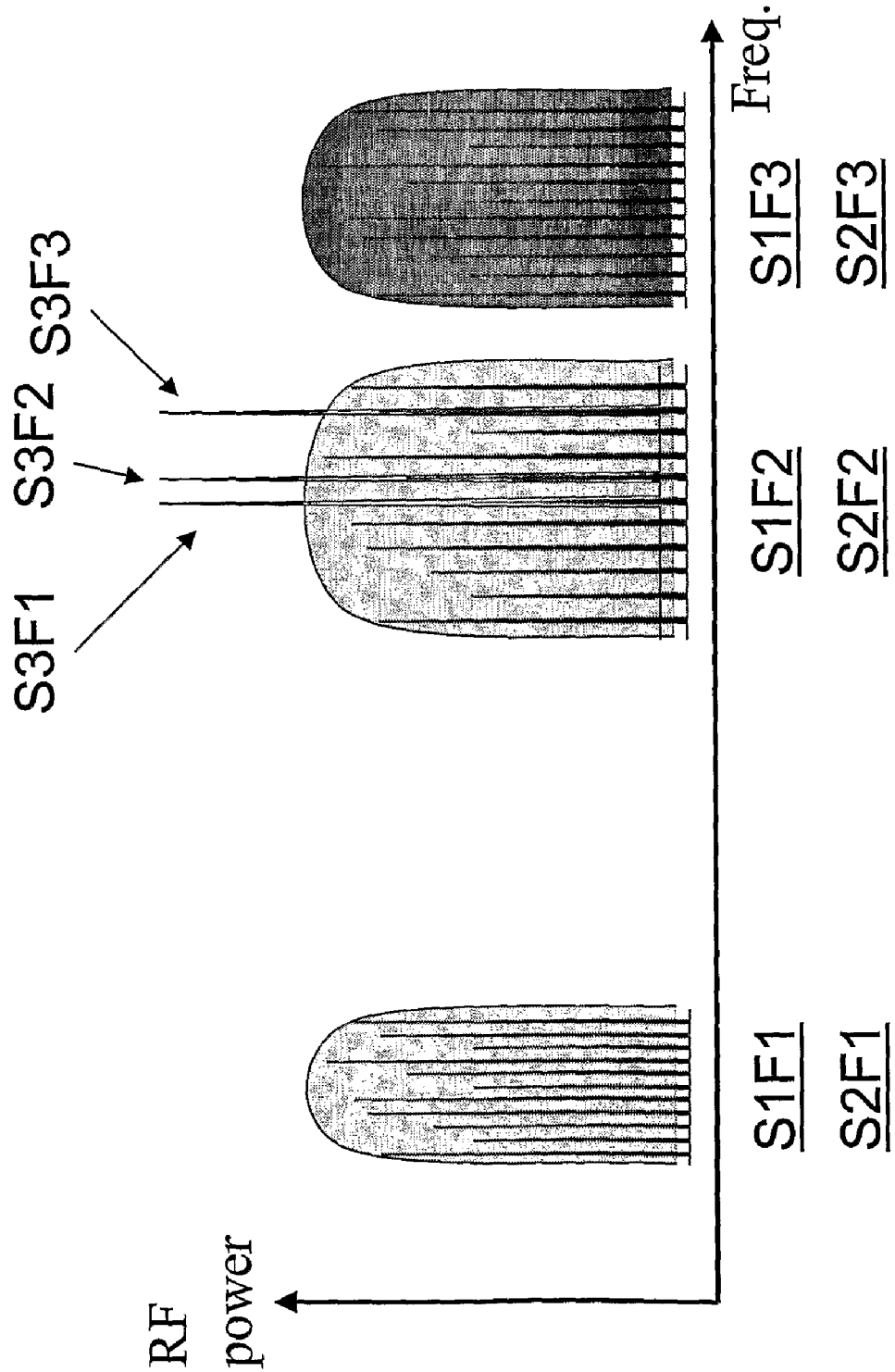
FIG. 4 schematically shows a frequency to power diagram according to a first embodiment of the invention.

FIG. 4 schematically shows a frequency to power diagram according to the present invention for the signals in the aircraft. FIG. 4 shows that the second signal S2, coming from the terrestrial network, comprises three frequency bands S2F1-S2F3. The screening device 2 in the onboard BTS generates a first signal S1 comprising three frequency bands S1F1-S1F3 corresponding to the three frequency bands S2F1-S2F3 in the second signal S2 and thus screens the second signal S2.

FIG. 4 also shows that the signal generator 3 generates a third signal S3 comprising three frequencies S3F1-S3F3 within one of the three frequency bands S1F1-S1F3. The third signal S3 is stronger than the first and the second signal S1, S2 thereby generating an s/n above the threshold. The second signal S2 has attenuated on its way from the ground and into the aircraft. The third signal S3 only has to be strong enough to give an s/n over the threshold in the aircraft and does not have to be as strong as the second signal S2 on the ground. Therefore, the third signal S3 does not disturb the terrestrial network because it decreases in strength on its way from the aircraft to the ground so that when it reaches the base stations in the terrestrial network the third signal does not add much or no noise to the signals close to the ground.

The signal traffic thus becomes directed to a dedicated access point in the aircraft so that interaction with any other network is prevented.

Figure 5:
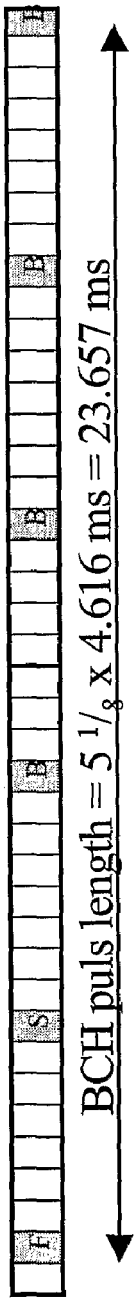
FIG. 5 schematically shows a BCH batch transmission pattern in a GSM based system, and where.

FIG. 5 schematically shows a BCH batch 8 transmission pattern in a GSM based system. The transmission pattern should be read from left to right and from the top to the bottom row by row. In FIG. 5 the BCH batch 8 is also shown as a sequence of time slots below the transmission pattern.

GSM is a TDMA technique with multiple frequency channels. Each frequency channel is divided into a TDMA frame comprising eight time slots, assigned to control channels or traffic channels (half rate or full rate TCH). The control channels comprise BCH, CCCH and DCCH, but it is only the BCH that needs to be disturbed. Each time slot is 0.577 ms long and the BCH burst length is 5 and ⅛ TDMA frames and consequently 23.657 ms long.

Each TDMA cell designates one time slot to a control channel in the form of a BCH and designates seven time slots as traffic channels TCH. BCH channels are used, by the BTS, to provide the UE with the sufficient information it needs to synchronize with the network. The BCH burst length extends over 5 and ⅛ TDMA frames and is consequently 23.657 ms long. The BCH burst length is also referred to as a BCH batch. Three different types of BCHs can be distinguished: the BCCH depicted with the letter B; the SCH depicted with the letter S, and FCCH depicted with the letter F.

In order to prevent GSM traffic it is only necessary to screen frequency channels transmitting any of the BCH.

Figure 6:
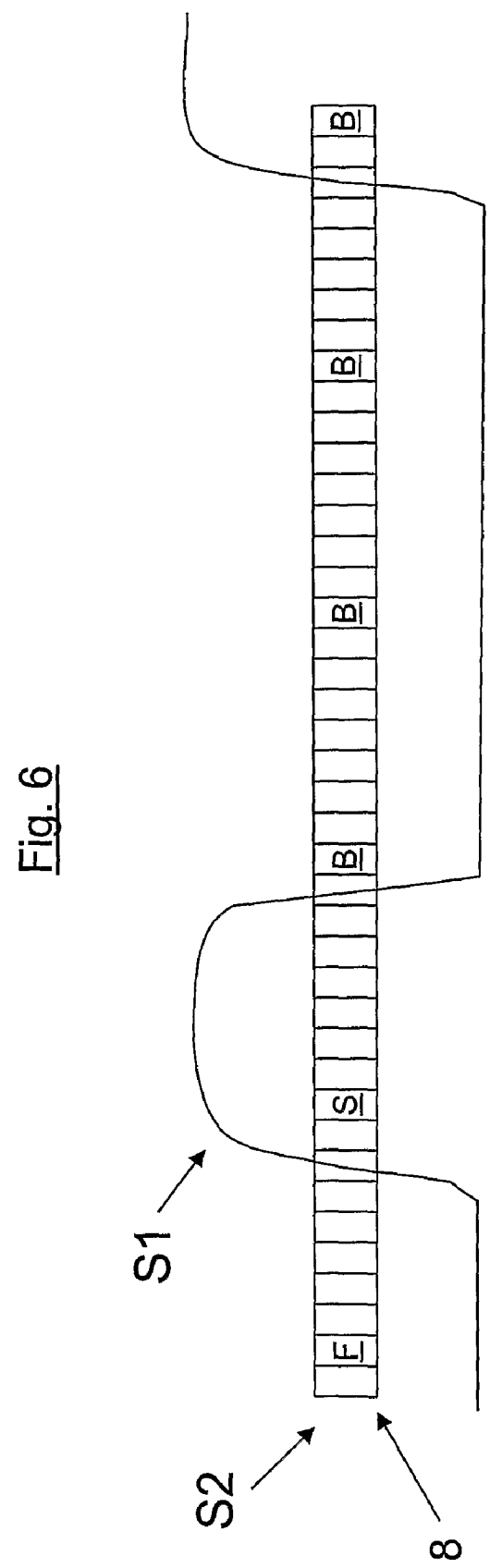
FIG. 6 schematically shows a second embodiment of the invention where a first signal from the inventive screening device is superposed on a second signal being a GSM transmission according to FIG. 5.

FIG. 6 schematically shows the first signal S1 from the inventive screening device superposed on the second signal S2 being a GSM transmission according to FIG. 5. In FIG. 6, the synchronization channel S is screened by the pulsed first signal S1. With a BCH batch 8 burst length that equals 23.657 ms the screening device 2 periodically transmits a pulse with a pulse length being at least 7 ms and with a repetition interval not exceeding 23.5 ms. The first signal S1 also has an effect matching the effect of the second signal such that the signal to noise ration becomes low enough for the UE to disregard the information in the control channel. The features of the pulsed first signal S1 hinders that any BCH batch 8 pass through intact.

In this embodiment, the third signal S3 is generated according to the embodiment described in connection to FIG. 4. The third signal is stronger than the first signal S1 and the second signal S2 and thus becomes the choice for the UE when trying to establish a communication link.

The invention claimed is:

1. A base transceiver station (BTS) for a cellular communication system onboard an aircraft, comprising a screening device arranged to generate a first signal being matched to screen a second signal from a terrestrial network when said aircraft is above a predetermined altitude, the onboard BTS also comprising a signal generator arranged to generate a third signal stronger than both the first signal and the second signal, the onboard BTS being arranged to establish a communication link with a user equipment (UE) via the third signal;

wherein the screening device is arranged to generate the first signal in the form of a pulsed first signal being matched to screen a control channel in the second signal; and wherein the screening device is arranged to generate the pulsed first signal with a pulse length of at least the same length as the pulse length of the control channel and with a repetition interval less than a broadcast channel burst length.

2. A base transceiver station (BTS) for a GSM cellular communication system onboard an aircraft, comprising a screening device arranged to generate a first signal being matched to screen a second signal from a terrestrial network when said aircraft is above a predetermined altitude, the onboard BTS also comprising a signal generator arranged to generate a third signal stronger than both the first signal and the second signal, the onboard BTS being arranged to establish a communication link with a user equipment (UE) via the third signal;

wherein the screening device is arranged to generate the first signal in the form of a pulsed first signal being matched to screen a control channel in the second signal; and, wherein the screening device is arranged to generate the pulsed first signal with a pulse length being at least 7 ms and with a repetition interval having a maximum value of 23.5 ms.

* * * * *

UNITED STATES PATENT AND TRADEMARK OFFICE
CERTIFICATE OF CORRECTION

| | |
|---|---|
| PATENT NO. | : 8,280,372 B2 |
| APPLICATION NO. | : 12/158898 |
| DATED | : October 2, 2012 |
| INVENTOR(S) | : Lagerman |

It is certified that error appears in the above-identified patent and that said Letters Patent is hereby corrected as shown below:

In Column 12, Line 4, in Claim 1, delete "and" and insert -- and, --, therefor.

Signed and Sealed this
Twenty-ninth Day of January, 2013

David J. Kappos
*Director of the United States Patent and Trademark Office*